US009667145B1

United States Patent
Goenawan et al.

(10) Patent No.: US 9,667,145 B1
(45) Date of Patent: May 30, 2017

(54) FAST TRANSIENT RESPONSE FOR SWITCHING REGULATORS

(71) Applicant: Marvell International Ltd., Hamilton (BM)

(72) Inventors: Sofjan Goenawan, Cupertino, CA (US); Luyang Luo, Chengdu (CN); Gareth Seng Thai Yeo, San Jose, CA (US); Wei Lu, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/019,937

(22) Filed: Feb. 9, 2016

Related U.S. Application Data

(60) Provisional application No. 62/115,058, filed on Feb. 11, 2015.

(51) Int. Cl.
   *H02M 3/158* (2006.01)
   *H02M 1/00* (2006.01)

(52) U.S. Cl.
   CPC .... *H02M 3/158* (2013.01); *H02M 2001/0009* (2013.01)

(58) Field of Classification Search
   CPC ............................................ H02M 2003/1566
   See application file for complete search history.

(56) References Cited

U.S. PATENT DOCUMENTS

| | | | | |
|---|---|---|---|---|
| 5,514,947 A | * | 5/1996 | Berg | H02M 3/156 323/282 |
| 6,127,815 A | * | 10/2000 | Wilcox | G05F 1/565 323/282 |
| 6,828,766 B2 | * | 12/2004 | Corva | H02M 3/156 323/225 |
| 7,482,791 B2 | * | 1/2009 | Stoichita | H02M 3/156 323/271 |
| 8,368,374 B2 | | 2/2013 | Hachiya et al. | |
| 8,912,780 B2 | * | 12/2014 | Kawai | H02M 3/156 323/284 |

(Continued)

OTHER PUBLICATIONS

"Ex Parte Quayle Action", U.S. Appl. No. 15/019,949, Oct. 31, 2016, 5 pages.

(Continued)

*Primary Examiner* — Jeffrey Zweizig

(57) ABSTRACT

The present disclosure describes apparatuses and techniques of fast transient response for switching power regulators. In some aspects, a transconductance load is connected to a feedback amplifier of a switching power regulator that is operating in a discontinuous mode. This can be effective to dampen an indication, provided by the feedback amplifier, of voltage at an output of the switching power regulator while the regulator provides current to a load. Based on the dampened indication of the voltage, a current draw of the load is detected that exceeds the current provided to the load. Responsive to detecting the excessive current of the load, the switching regulator is transitioned to a continuous mode to provide an increased amount of the current to the load. Alternately or additionally, the increased amount of current can be allowed to exceed a nominal current limit protection threshold by a predefined amount of current, for a predefined number of switching cycles, or for a predefined amount of time.

20 Claims, 9 Drawing Sheets

(56) References Cited

U.S. PATENT DOCUMENTS

| | | | |
|---|---|---|---|
| 8,928,305 B2 | | 1/2015 | Ueunten et al. |
| 9,035,624 B1 | | 5/2015 | Rahimi et al. |
| 9,116,534 B2 | * | 8/2015 | Cheng ..................... G05F 1/46 |
| 9,285,822 B2 | * | 3/2016 | Fukazawa ................. G05F 3/30 |
| 9,391,511 B2 | * | 7/2016 | Yu et al. ............... H02M 3/156 |
| 9,425,689 B2 | | 8/2016 | Li et al. |
| 2012/0062204 A1 | | 3/2012 | Draxelmayr |
| 2014/0266090 A1 | | 9/2014 | Wei et al. |
| 2015/0155784 A1 | * | 6/2015 | Ouyang ............. H02M 3/1563 323/285 |
| 2015/0200592 A1 | * | 7/2015 | Chang .................. H02M 3/156 323/271 |
| 2015/0280558 A1 | | 10/2015 | Lopata et al. |
| 2015/0311795 A1 | | 10/2015 | Yang et al. |
| 2015/0372613 A1 | | 12/2015 | Houston et al. |

OTHER PUBLICATIONS

"Non-Final Office Action", U.S. Appl. No. 15/019,946, Oct. 31, 2016, 8 pages.
"Restriction Requirement", U.S. Appl. No. 15/019,950, Oct. 26, 2016, 5 pages.
"Non-Final Office Action", U.S. Appl. No. 15/019,950, Mar. 31, 2017, 12 pages.
"Notice of Allowance", U.S. Appl. No. 15/019,946, Mar. 14, 2017, 5 pages.
"Notice of Allowance", U.S. Appl. No. 15/019,949, Jan. 23, 2017, 5 pages.

\* cited by examiner

FAST TRANSIENT RESPONSE FOR SWITCHING REGULATORS

RELATED APPLICATIONS

This present disclosure claims priority to U.S. Provisional Patent Application Ser. No. 62/115,058 filed Feb. 11, 2015, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this disclosure and are not admitted to be prior art by inclusion in this section.

Computing and electronic devices include power regulators for stepping battery or external power down to voltages that are suitable for various internal components, such as processors, memory, displays, network interfaces, and the like. Efficiency of power regulation is often an important performance metric because inefficient power regulators produce excessive heat, consume more design space, or reduce run-times of battery-powered devices. To optimize power regulator efficiency, power regulators typically implement multiple operating modes that provide optimal efficiencies over different respective ranges of current loading.

Current loads of many device components (e.g., processors), however, are dynamic and can quickly transition from very low current loads to very high current loads. When these load transitions occur, power regulators often switch between operating modes to accommodate the increased amount of current drawn by the components. In some cases, latency associated with switching between the operating modes allows the increased amount of current to draw down a voltage of the power regulator's output. If the voltage at the regulator's output falls below a minimum specification for the components, the components of the device can be impaired or damaged by operating in a low-voltage condition.

SUMMARY

This summary is provided to introduce subject matter that is further described below in the Detailed Description and Drawings. Accordingly, this Summary should not be considered to describe essential features nor used to limit the scope of the claimed subject matter.

A power supply circuit is described that includes a transistor configured to provide current to a load connected to an output of the power supply circuit and an amplifier having an output configured to provide an indication of voltage at the output of the power supply circuit. The circuit further comprises a transconductance load having a transconductance less than a transconductance of the amplifier and a switch connected between the output of the amplifier and the transconductance load. A controller of the circuit is configured to connect, via the switch and while operating in a discontinuous mode, the transconductance load to the output of the amplifier effective to dampen the indication of the voltage. The controller is further configured to detect, based on the dampened indication of the voltage, that a current draw of the load exceeds the current being provided. Responsive to detecting the excessive current draw of the load, the controller transitions to a continuous mode of operation effective to increase the amount of current provided by the transistor to the load.

A method is described for determining that a switching power regulator is operating in a discontinuous mode of operation to provide current to a load connected to an output of the switching power regulator. The discontinuous mode of operation controls a voltage at the output of the switching regulator based on an indication of the voltage provided by a feedback amplifier. Responsive to the determination, a transconductance load is connected to an output of the feedback amplifier to dampen the indication of the voltage provided by the feedback amplifier. The method then detects, based on the dampened indication of the voltage, that a current draw of the load exceeds an amount of the current provided by the switching regulator operating in the discontinuous mode. Responsive to this detection, the method causes the switching power regulator to transition to a continuous mode of operation effective to increase the amount of current provided to the load. In some cases, the increased amount of current provided to the load is allowed to exceed a nominal current protection threshold by a predefined amount (e.g., 25-30% of the threshold) for a predetermined amount of time or number of switching cycles.

A System-on-Chip (SoC) is described that includes first and second transistors coupled to an output of the SoC at which current is provided by the first and second transistors to power a load. The SoC also includes an error amplifier having an input operably connected an input of the SoC at which a voltage is received from the load and an output configured to provide an indication of the voltage. The SoC further comprises a transconductance load having a transconductance less than a transconductance of the error amplifier and a switch that is connected between the output of the error amplifier and the transconductance load. A controller of the SoC is configured to connect, via the switch and while operating in a discontinuous mode, the transconductance load to the output of the amplifier effective to dampen the indication of the voltage. The controller is also configured to detect, based on the dampened indication of the voltage, that a current draw of the load that exceeds the current provided in the discontinuous mode. Responsive to detecting the excessive current draw of the load, the controller transitions to a continuous mode of operation effective to increase the amount of current provided by the first and second transistors to the load.

The details of one or more implementations are set forth in the accompanying drawings and the description below. Other features and advantages will be apparent from the description and drawings, and from the claims.

BRIEF DESCRIPTION OF THE DRAWINGS

The details of one or more implementations of fast transient response for switching regulators are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

Figure 1:
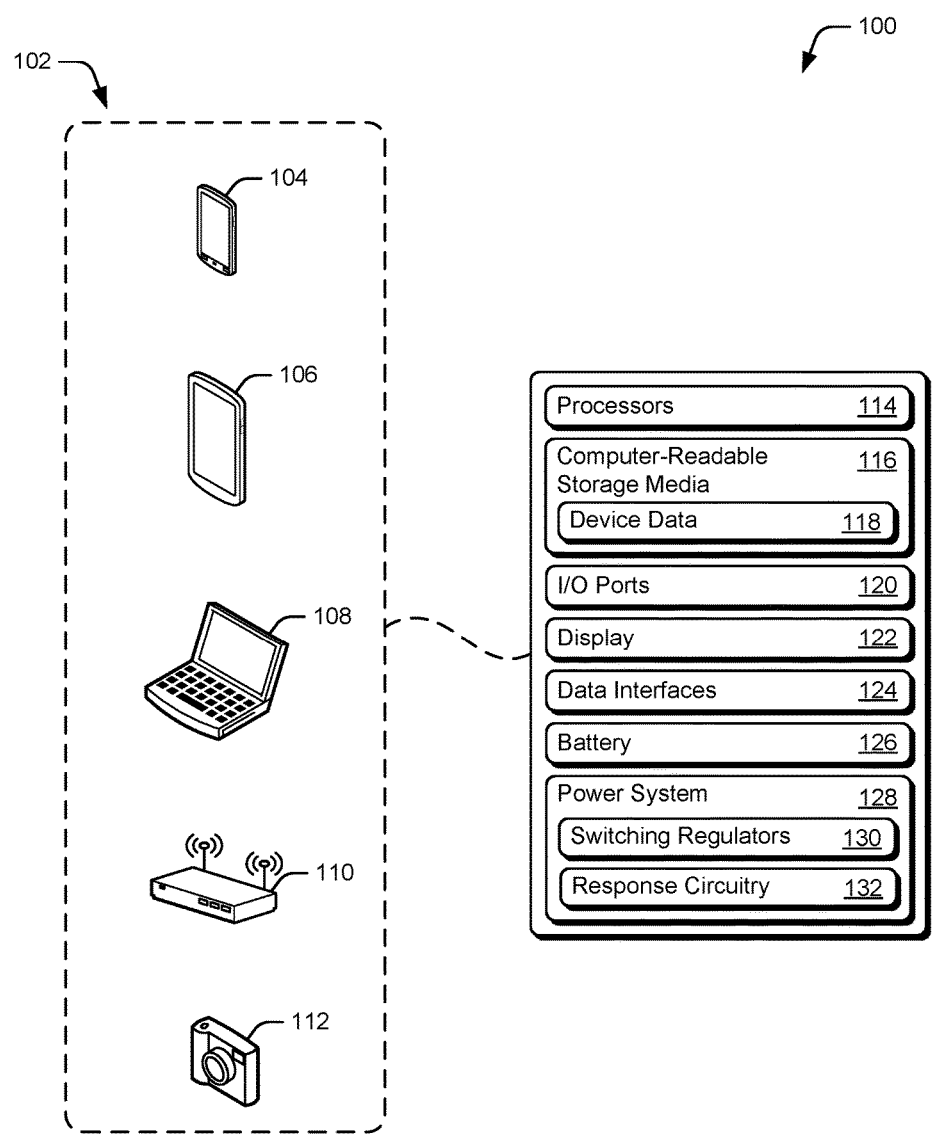
FIG. 1 illustrates an operating environment having computing devices and switching regulators in accordance with one or more aspects.

Conventional switching regulators typically operate in different modes to regulate power efficiently over different respective ranges of current loading. For example, a switching regulator may operate in a continuous mode (e.g., pulse-width modulation) to provide a high amount of current or a discontinuous operating mode (e.g., pulse frequency modulation mode) to conserve power while providing a small amount of current. While operating in either mode, however, conventional switching regulators use similar feedback or compensation circuitry to control characteristics of the power provided by the switching regulator. This can be problematic when load steps occur, such as when a processor wakes up from a sleep state and load demand on the switching regulator rapidly transitions from a few micro amps (or micro amperes) to multiple amps (or amperes).

While operating in the discontinuous mode, there are long periods of time for which the switching regulator is inactive. During these periods of time, the feedback or compensation circuitry can discharge or saturate down to low voltage levels, which slows the switching regulator's response for regulating voltage. For low current loads, this is acceptable because a bulk capacitance at the switching regulator's output is often able to provide a few micro amps to a few milliamps of current while the feedback circuitry recovers. For a load step to high current load, however, the bulk capacitance is relatively small and the high current load can quickly draw down voltage at the switching regulators output.

For example, consider feedback circuitry that includes an error amplifier (e.g., feedback amplifier) with an output of one microamp and a compensation capacitor of ten picofarads, which would take 1 microsecond to charge at one microamp. A load step of one amp applied to a switching regulator with ten microfarad of bulk output capacitance for one microsecond can drop the output voltage by more than 100 millivolts. For processors fabricated on advanced technologies (e.g., 28 nm or 16 nm) that operate at one volt or less, 20 mV, 30 mV, or 100 mV constitutes an appreciable percentage of nominal supply voltage. As noted above, operating processors or other components in low-voltage conditions can compromise performance, integrity, or structure of these components.

This disclosure describes apparatuses and techniques of fast transient response for switching regulators. In some aspects, a transconductance load is connected to an output of an error amplifier of a switching regulator that is operating in a discontinuous mode. This can be effective to dampen an indication of voltage at the switching regulator's output and prevent the output of the error amplifier from saturating down to a low-voltage. By so doing, the switching regulator can more-quickly respond, based on the dampened indication of the voltage, to a load's increased demand for current, thereby improving a transient load response of the switching regulator. In at least some cases, improving the switching regulator's transient response reduces voltage drop at the regulator's output when load steps occur. Reducing or eliminating the voltage drop can ensure proper component operation or prevent damage associated with operating components in low-voltage conditions. Alternately or additionally, after transitioning from the discontinuous mode to a continuous mode, a current limit of the switching regulator can be allowed to exceed its nominal current limit protection threshold (e.g., a peak current limit) by a predefined amount of current, for a predetermined amount of time, or for a predefined number of switching cycles.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

FIG. 1 illustrates an example operating environment 100 having a computing device 102, which is capable of operating by drawing power from a battery or an external source. Examples of the computing device 102 include a smart phone 104, a tablet computer 106, a laptop computer 108, a broadband router 110, and a digital camera 112. Further examples of the computing device 102 include a desktop computer, a set-top-box, a data storage appliance (e.g., network-attached storage), a personal media device, a navigation device, a portable gaming device, and so on. The computing device 102 may draw the operating power for any suitable purpose, such as to enable functionalities of a particular type of device, provide a user interface, enable network access, implement gaming applications, capture images, play media, edit content, and the like.

The computing device 102 includes processors 114 and computer-readable storage media 116. The processors 114 can be any suitable type of processor, either single-core or multi-core, for executing code, instructions, or commands of an operating system or application of the computing device 102. The computer-readable media 116 (CRM 116) may include volatile memory or nonvolatile memory to store device data 118. In the context of this disclosure, the CRM 116 is implemented as storage media, and thus does not include transitory signals or carrier waves.

The computing device 102 may also include input/output (I/O) ports 120, a display 122, and data interfaces 124. The I/O ports 120 allow a computing device 102 to interact with other devices and/or users. The I/O ports 120 may support a variety of connections, such as a universal serial bus (USB), peripheral component interconnect express (PCIe) port, serial port, parallel port, or infrared port. The display 122 presents graphics of the computing device 102, which may include user interface elements of an operating system, applications, or system utilities.

The data interfaces 124 provide connectivity to one or more networks and other devices connected therewith. The data interfaces 124 may include wired interfaces, such as Ethernet or fiber optic interfaces for communicating over a local network, intranet, or the Internet. In some cases, the data interfaces 128 include wireless interfaces that facilitate communication over wireless networks, such as wireless local-area-networks (WLANs), cellular networks, and/or wireless personal-area-networks (WPANs).

The computing device 102 may also include a battery 126 that provides power to support operations of the device's components, such as the processors 114, display 122, or data interfaces 124. Although not shown, the computing device 102 includes an external power connection through which power is received to charge the battery 126. In some cases, the external power connection is implemented in conjunction with one of the data interfaces 124, such as a USB port. Alternately or additionally, the components of the computing device 102 may operate from the power received via the external power connection while the battery 126 is charged.

A power system 128 of the computing device 102 steps power from the battery 126 down to voltages that are suitable for use by the device's components. The power system 128 includes switching regulators 130 and transient response circuitry 132 (response circuitry 132). Although not shown, power system 130 may also include a charging circuit capable of charging battery 126 using an external power source (e.g. an alternating current (AC) or direct current (DC) source). The switching regulators 130 may include any suitable number of regulators configured to provide power at various voltages, such as five volts, three volts, one volt, and so on. The implementation and use of response circuitry 132 varies, and is described below.

Figure 2:
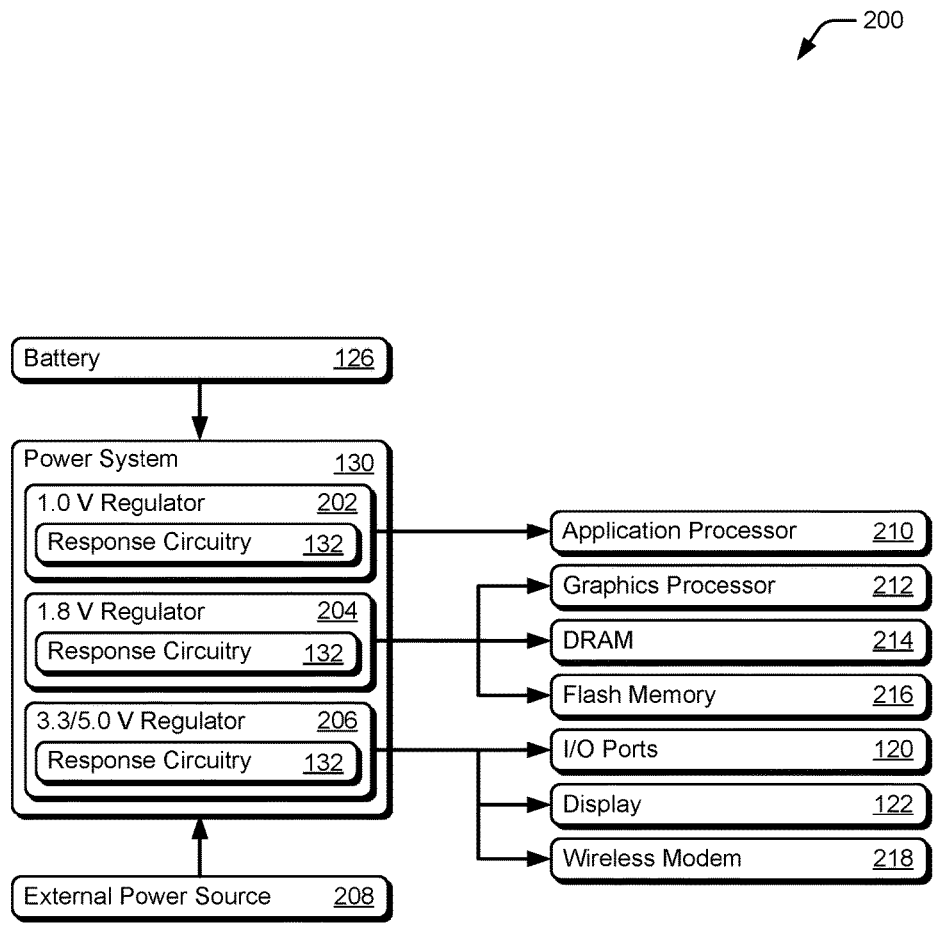
FIG. 2 illustrates an example configuration of the switching regulators and device components shown in FIG. 1.

FIG. 2 illustrates an example configuration of the power system 128 and switching regulators 130 of FIG. 1 generally at 200. In this particular example, the power system 130 includes a 1.0 volt switching regulator 202 (1.0 V regulator 202), a 1.8 volt switching regulator 204 (1.8 V regulator 204), and a 3.3/5.0 volt switching regulator 206 (3.3/5.0 V regulator 206), which is configured as a dual output switching regulator. Each of the power regulators 202, 204, and 206 also include a respective instance of response circuitry 132, the implementation and use of which is described below. The switching regulators of power system 130 step down voltage of the power provided by the battery 126 or an external power source 208 of computing device 102, such as an AC adapter.

Each component of the computing device 102 may operate at different nominal voltage, such as 5.0 volts, 3.3 volts, 1.8 volts, 1.0 volt, 0.9 volts, and so on. As shown in FIG. 2, the 1.0 volt regulator 202 steps down battery or external power to 1.0 volt for one of processors 114, which is configured as an application processor 210. The application processor 210, or others of the processors 114, may have multiple operating states, such as full-power, half-power (e.g., half of processing cores active), idle, sleep, off, and the like. Operational power, and thus current, consumed by the application processor 210 in each of the operational states may also vary. For example, the application processor 210 may consume a few micro amps while in a sleep state, a few milliamps while idle, and multiple amps in a full-power operational state. As such, a load step associated with waking the application processor 210 from a sleep state may include a current draw transition from a few micro amps to multiple amps (e.g., five to six amps).

The 1.8 volt regulator 204 steps down battery or external power to 1.8 volts for another of processors 114, which is configured as a graphics processor 212. The graphics processor 212 may also have multiple operating states ranging from full-power to off and consume various amounts of operating current, ranging from a few milliamps to multiple amps. In some cases, waking the graphics processor 212 from an idle or sleep state subjects the 1.8 volt regulator to a load step of multiple amps. The 1.8 volt regulator also provides operating power at 1.8 volts for dynamic random access memory (DRAM) 214, flash memory 216, and other components having an operating voltage of 1.8 volts.

The 3.3/5.0 volt regulator 206 steps down battery or external power to 3.3 volts and 5.0 volts for the I/O ports 120, display 122, and one of the data interfaces 124, which is configured as a wireless modem 218. Any or all of these components may have multiple operating states and may be powered down to lower operational state when possible to conserve power of the battery 126. For example, a power management utility of the computing device 102 may power down the processors 114, DRAM 214, display 122, and wireless modem 218 after a predetermined amount of time elapses for which the computing device 102 is inactive (e.g., device sleep state).

Figure 3:
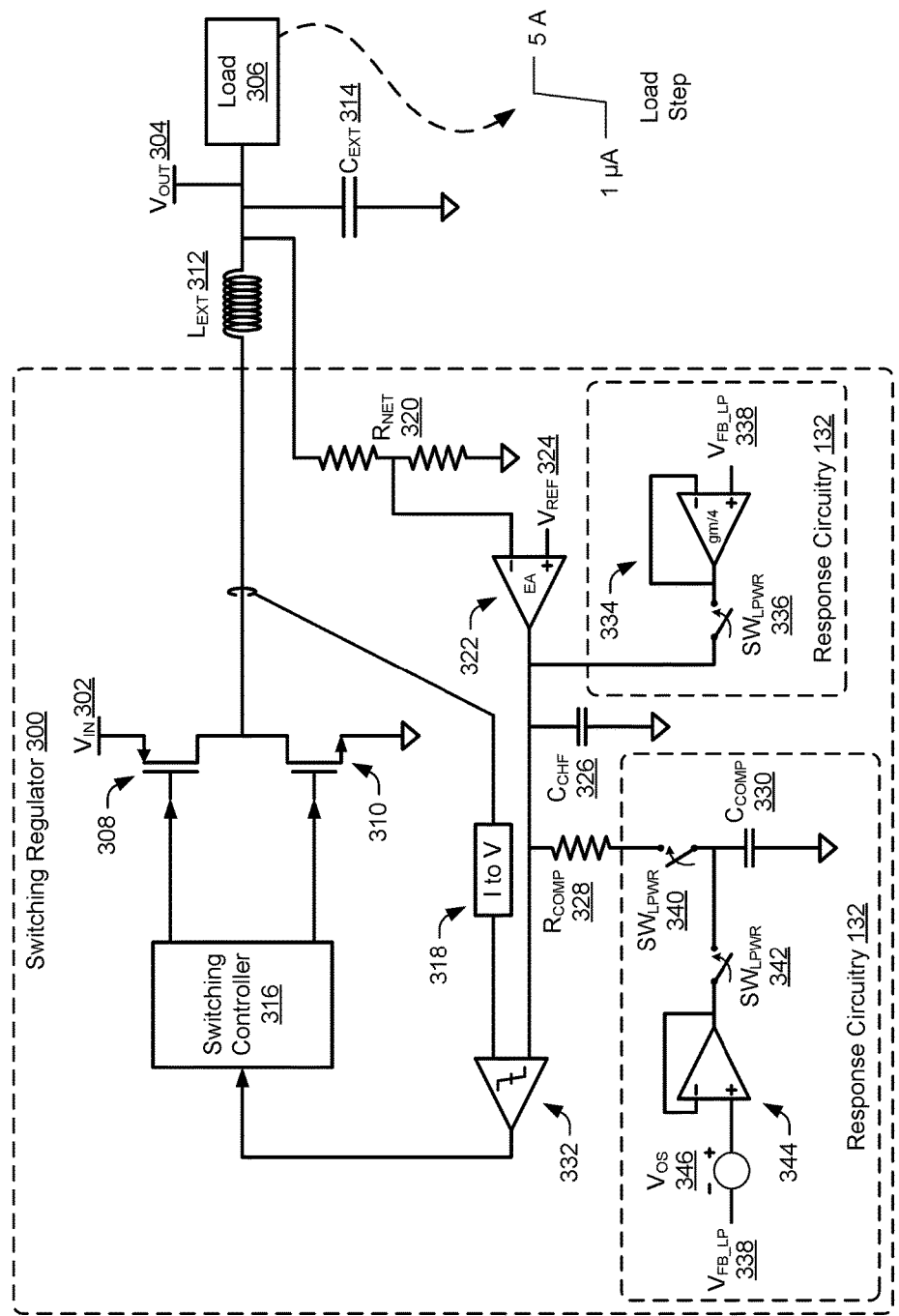
FIG. 3 illustrates an example switching regulator that includes circuitry for fast transient response in accordance with one or more aspects.

FIG. 3 illustrates an example of a switching regulator 300 that includes circuitry for fast transient response in accordance with one or more aspects. The switching regulator 300 is configured to step power (e.g., battery power) from an input voltage 302 ($V_{IN}$ 302) down to an output voltage 304 ($V_{OUT}$ 304), which is suitable for use by a load 306. Examples of the load 306 may include the processors 114, CRM 116, display 122, data interfaces 126, or other components of the computing device 102.

The switching regulator 300 includes a high-side switch 308 connected to $V_{IN}$ 302 and low-side switch 310 connected to ground (or other lower potential) that provide current to the load 306 via an external inductor 312 ($L_{EXT}$ 312). The high-side switch 308 and low-side switch 310 may be implemented using any suitable transistors, such as n-channel and p-channel metal-oxide-semiconductor field-effect transistors (MOSFETs). Although shown as internal components of the switching regulator 300, the high-side switch 308 and low-side switch 310 may be implemented as external discrete components.

The external inductor 312 and external capacitor 314 store energy at the output of the switching regulator 300. For example, while the high-side switch 308 is active current in the external inductor 312 and voltage in the external capacitor 314 ramp up. When the high-side switch 308 is off, the energy stored by the external inductor 312 and external capacitor 314 is released to the load 306. These components function as an inductor-capacitor (LC) low-pass filter that smooths the output of power provided by the switching regulator 300.

The high-side switch 308 and low-side switch 310 are controlled by switching controller 316, which may be implemented as any suitable type of microcontroller, state machine, digital-signal processor (DSP) and the like. The switching controller 316 activates or turns on the high-side switch 308 or low-side switch 310 to regulate the output voltage 304. Alternately or additionally, the switching controller 316 may also control the high-side switch 308 or low-side switch 310 to regulate an amount of current or power provided to the load 306.

To regulate the output voltage 304 of the switching regulator 300, the switching controller 316 receives feedback of current or voltage provided at the output of the switching regulator 300. For example, a current-to-voltage converter 318 provides an indication of switch current provided by the high-side switch 308 or low-side switch 310. The output voltage 304 is reduced to an acceptable signal level by a resistor network 320 ($R_{NET}$ 320) or voltage divider and then amplified by an error amplifier 322 based on a reference voltage 324 ($V_{REF}$ 324). An indication of the output voltage 304 is provided by an output of the error amplifier 322, which is compensated by high frequency compensation capacitor 326, compensation resistor 328, and compensation capacitor 330.

A comparator 332 receives the indication of the switch current and the indication of the output voltage 304 at respective inputs and provides a comparison result to the switching controller 316. Based on this comparison result of the feedback, the switching controller 316 can activate the high-side switch 308 or low-side switch 310 to regulate the output voltage 304. In some cases, the switching controller 316 operates in a continuous mode or frequency-based modes, such as a constant frequency mode or pulse-width modulation (PWM) mode. In a continuous mode, the switching controller 316 can activate the high-side switch 308 and low-side switch 310 based on an approximate operating frequency that ranges from 500 KHz to several mega-Hertz (e.g., 0.5-7 MHz). The continuous mode of the switching regulator may efficiently provide power for high-current loads (e.g., multiple amps), such as processors or wireless modems operating at full-power.

The switching regulator 300 also operates in a discontinuous mode, such as a power save mode (PSM) or pulse frequency modulation (PFM) mode. In the discontinuous mode, the switching regulator 300 may wait until the output voltage 304 falls below a threshold before turning on high-side switch 308. For example, the output voltage 304 may saw-tooth between a maximum PFM mode voltage and the threshold while the load 306 continues to draw current. The discontinuous mode or PFM mode may efficiently provide power for low-current loads (e.g., microamps or milliamps), such as processors or wireless modems in an idle or sleep state. In some cases, while operating in the PFM mode, the switching regulator 300 only switches on when more power is needed. In other words, most of the time the switching regulator 300 is in an off-state that consumes no power (e.g., no power loss). Therefore, the power loss is significantly reduced in the PFM mode, which increases an efficiency of the switching regulator 300 with light load conditions.

In some aspects, the response circuitry 132 includes a transconductance load 334 and a switch 336, which is useful to connect the transconductance load 334 to the output of error amplifier 322. In this particular example, the transconductance load 334 is configured as an operational amplifier (op-amp) buffer (e.g., unity gain buffer) with an input set by low-power feedback voltage 338 ($V_{FB\_LP}$ 338). The low-power feedback voltage 338 can be set to an approximate nominal voltage of the error amplifier 322 effective to prevent the output of the error amplifier from saturating when the transconductance load is connected thereto.

Transconductance load 334 may have any suitable transconductance (gm), such as a transconductance proportional to or less than a transconductance of the error amplifier 322. In some cases, the transconductance load 334 has a transconductance value that ranges from approximately one half to one quarter of that of the error amplifier 322. In other cases, the transconductance load 334 has a transconductance that is less than approximately one quarter of the transconductance of the error amplifier 322. These transconductance load values can be effective to decrease a DC gain from the input of the error amplifier 322 when the transconductance load 334 is connected to the output of the error amplifier.

For example, when the transconductance load 334 is approximately one fourth of the transconductance of the error amplifier 322, the DC gain of the error amplifier is approximately four (e.g., gm/(gm/4)=4). Alternately or additionally, connecting the transconductance load 334 to the output of the error amplifier 322 converts the error amplifier 322 from an integrator to a damped integrator with an output gain that is inversely proportional to the value of the transconductance load 334 (e.g., a gain of 4). In some cases, this can be effective to prevent the output of the error amplifier 322 from saturating to a low-voltage level during periods of inactivity, such as when the switching regulator 300 operates in a discontinuous mode, pulse frequency modulation mode, or power save mode.

In other aspects, the response circuitry 132 includes a switch 340 to disconnect the compensation capacitor 330 from the output of the error amplifier 322. In some cases, disconnecting the compensation capacitor 330 prevents the compensation capacitor 330 from discharging during periods of inactivity, such as when the switching regulator 300 operates in a discontinuous mode or PFM mode. Because the output of the error amplifier 322 may be limited to a few microamps, disconnecting the compensation capacitor 330 can be effective to reduce an amount of energy, and therefore time, the compensation capacitor 330 consumes to charge up to a nominal operating voltage. For example, reconnecting a non-discharged compensation capacitor 330 when transitioning to a continuous operation mode can enable the switching regulator 300 to respond more-quickly to load steps.

The response circuitry 132 may also include a switch 342 to connect the compensation capacitor 330 to an op-amp buffer 344 that is configured to provide charging energy. In some cases, the compensation capacitor 330 is connected to the op-amp buffer 344 while the compensation capacitor 330 is disconnected from the output of the error amplifier 322. Connecting the compensation capacitor 330 to the op-amp buffer 344 enables the compensation capacitor to be charged or pre-charged while out-of-circuit. For example, when the switching regulator 300 operates in a discontinuous mode or PFM mode, the compensation capacitor 330 can be pre-charged based on an input voltage of the op-amp buffer 344. The input voltage of the op-amp buffer 344 can be any suitable voltage, such as the low-power feedback voltage 338. In this particular example, an offset voltage 346 of approximately 25 millivolts is applied to the low-power feedback voltage 338. As noted above, reducing the energy consumed by the compensation capacitor to charge up to a nominal voltage can enable the switching regulator 300 to respond more-quickly to load steps.

Figure 4:
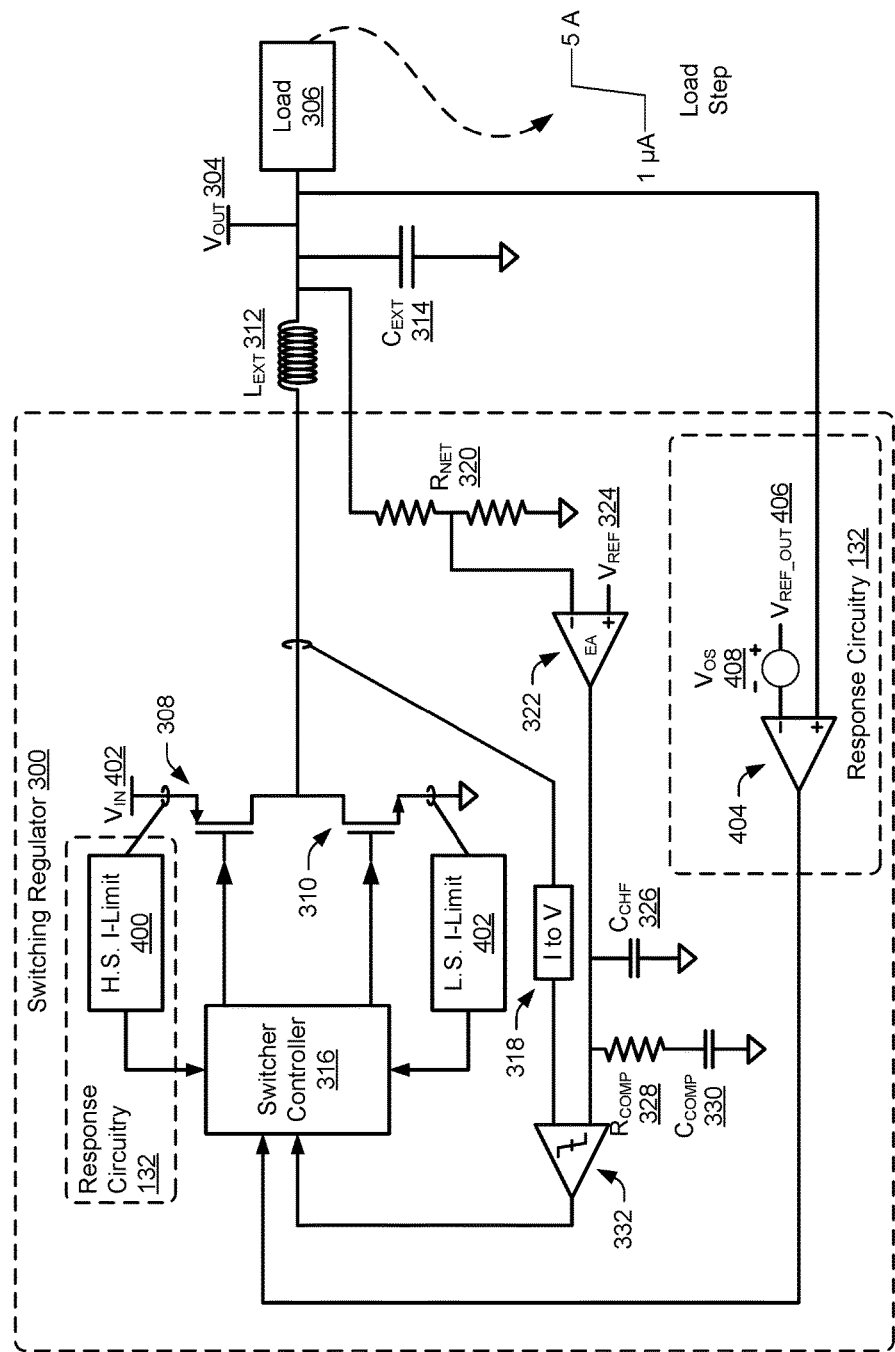
FIG. 4 illustrates another example switching regulator that includes circuitry for fast transient response in accordance with one or more aspects.

FIG. 4 illustrates another example of the switching regulator 300 that includes circuitry for fast transient response in accordance with one or more aspects. In this particular example, the switching regulator 300 includes a high-side current limiter 400 (H.S. I-limit 400) and a low-side current limiter 402 (L.S. I-limit 402). The high-side current limiter 400 and low-side current limiter 402 may be implemented as any suitable type of circuitry, such as current sense resistors, resistor networks, comparators, analog-to-digital converters, logic gates, and so on.

The high-side current limiter 400 and low-side current limiter 402 monitor the switch current provided to the external inductor 312. In some cases, the current limiters are configured with predefined thresholds (e.g., time or amps) at which the high-side switch 308 and low-side switch 310 are turned off to protect the switches or downstream components. For example, when the high-side switch 308 turns on, the high-side current limiter 400 monitors the current provided to the external inductor 312.

Responsive to the monitored current exceeding the predefined threshold (e.g., triggering a current limit), the high-side current limiter can provide an indication of the excessive current to the switching controller 316. To protect the high-side switch 308 or other components, the switching controller 316 can deactivate or turn off the high-side switch 308. When these current limits are triggered by a load step, deactivating the high-side switch 308 may prevent the switching regulator 300 from being able to quickly respond to the load step. In other cases, however, the switching controller 316 may allow the current to exceed the predefined thresholds for a predefined number of switching cycles to provide an increased amount of current to the load 306. In such cases, this increased amount of current may prevent voltage drop at the output of the switching regulator 300, thereby improving the switching regulator's response to a load step.

In other aspects, the response circuitry 132 includes comparator 404 as part of an output voltage monitoring circuit. The output voltage monitoring circuit may also comprise a reference output voltage 406 (e.g., a specified output voltage 304) and voltage offset 408 that enable calibration of the output voltage monitoring circuit. The comparator may directly monitor the voltage at the output of the switching regulator and provide an indication of low output voltage to the switching controller 316.

In some cases, a detection threshold provided by the reference output voltage 406 or the voltage offset 408 is set within an approximate variation tolerance of the switching controller 316's regulation loop. In such cases, the voltage offset 408 may comprise approximately two to five percent of the output voltage, which is subtracted from the reference output voltage 406 to provide a comparison threshold. The switching controller 316 may then receive an indication of low output voltage if the output voltage 304 falls, based on the voltage offset 408, out of regulation for a given operational mode. Alternately or additionally, the voltage offset 408 may be auto-calibrated when the switching regulator starts to ensure accuracy of the voltage offset 408 and associated comparison threshold for low-voltage monitoring. Further, the error amplifier 322 may also be trimmed or calibrated to reduce an offset for accurate regulation of the output voltage or for generating the voltage offset 408 with a high accuracy.

Techniques of Fast Transient Response for Switching Regulators

The following discussion describes techniques of fast transient response for switching regulators. These techniques can be implemented using the previously described environments and entities, such as response circuitry 132 and various components thereof. These techniques include methods illustrated in FIGS. 5, 6, 7, and 8, each of which is shown as a set of operations performed by one or more entities. These methods are not necessarily limited to the orders shown for performing the operations and may be looped, repeated, or re-ordered to implement various aspects described herein. Further, these methods may be used in conjunction with one another, in whole or in part, whether performed by the same entity, separate entities, or any combination thereof. In portions of the following discussion, reference will be made to operating environment 100 of FIG. 1 and entities of FIGS. 3 and 4 by way of example. Such reference is not to be taken as limited to operating environment 100 but rather as illustrative of one of a variety of examples.

Figure 5:
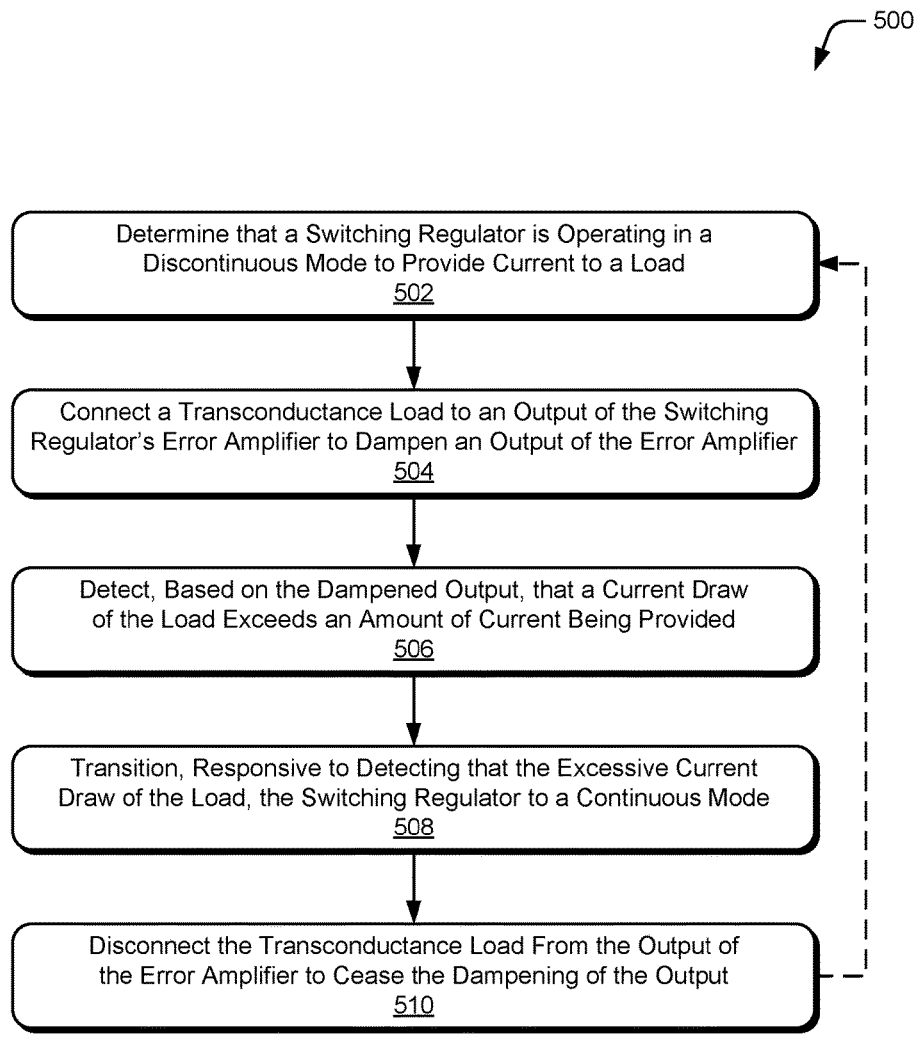
FIG. 5 illustrates an example method for connecting a transconductance load to an error amplifier to increase a transconductance of the error amplifier.

FIG. 5 depicts a method 500 for connecting a transconductance load to an error amplifier to increase a transconductance of the error amplifier, including operations performed by the switching controller 316 and/or the response circuitry 132.

At 502, it is determined that a switching regulator is operating in a discontinuous mode to provide current to a load. The discontinuous mode of operation may include a pulse frequency modulation or power save mode that includes long periods of inactivity. In some cases, this inactivity permits voltage of switching regulator's compensation circuitry to discharge or fall. For example, longer cycles of voltage feedback (e.g., voltage saw-toothing) may cause an output of an error amplifier to drive down the voltage of the compensation circuitry.

At 504, a transconductance load is connected to an output of the switching regulator's error amplifier. This can be effective to dampen the output of the error amplifier or reduce a DC gain of the error amplifier. The transconductance load can be connected via any suitable means, such as a switch controlled by a controller of the switching regulator. In some cases, connecting the transconductance load changes the error amplifier from an integrator to a damped integrator with a gain proportional to the transconductance of the transconductance load. By so doing, voltage drop at the error amplifier's output can be limited based on the DC gain of the error amplifier.

At 506, an increase in the amount of current drawn by the load is detected based on the damped output of the error amplifier. The amount of current drawn by the load may exceed the amount of current the switching regulator provides in the discontinuous mode of operation. For example, the increase in the amount of current drawn may be a load step of several amps, such as from microamps to several amps. In such cases, the load step may begin to draw down the voltage at the output of the switching regulator. By limiting the error amplifier's output droop in the discontinuous mode, the switching regulator is able to respond more-quickly to the falling output voltage.

At 508, the switching regulator is transitioned from the discontinuous mode to a continuous mode of operation. In some cases, the transition to the continuous mode of operation can be responsive to detecting the excessive current draw of the load. In other cases, the transition can be caused responsive to detecting that the amount of current consumed by the load exceeds the amount of current being provided by the switching regulator. Transitioning to the continuous mode of operation enables the switching regulator to increase the amount provided to the load and thus prevent further loss of voltage at the switching regulator's output. As such, quickly responding to the load step can be effective to prevent voltage drop at the output of the switching regulator.

At 510, the transconductance load is disconnected from the output of the error amplifier to cease the dampening of the output. This can be effective to cease to dampen the output of the error amplifier, improve voltage regulation at the output of the switching regulator, or to change the error amplifier's function from a damped integrator to a lossless integrator. The transconductance load can be disconnected via any suitable means, such as by opening a switch controlled by a controller of the switching regulator. In some cases, disconnecting the transconductance load changes the error amplifier from a damped integrator with a gain to an integrator for operation in the continuous mode. From operation 510, the method may return to operation 502 responsive to transitioning back to the discontinuous mode.

Figure 6:
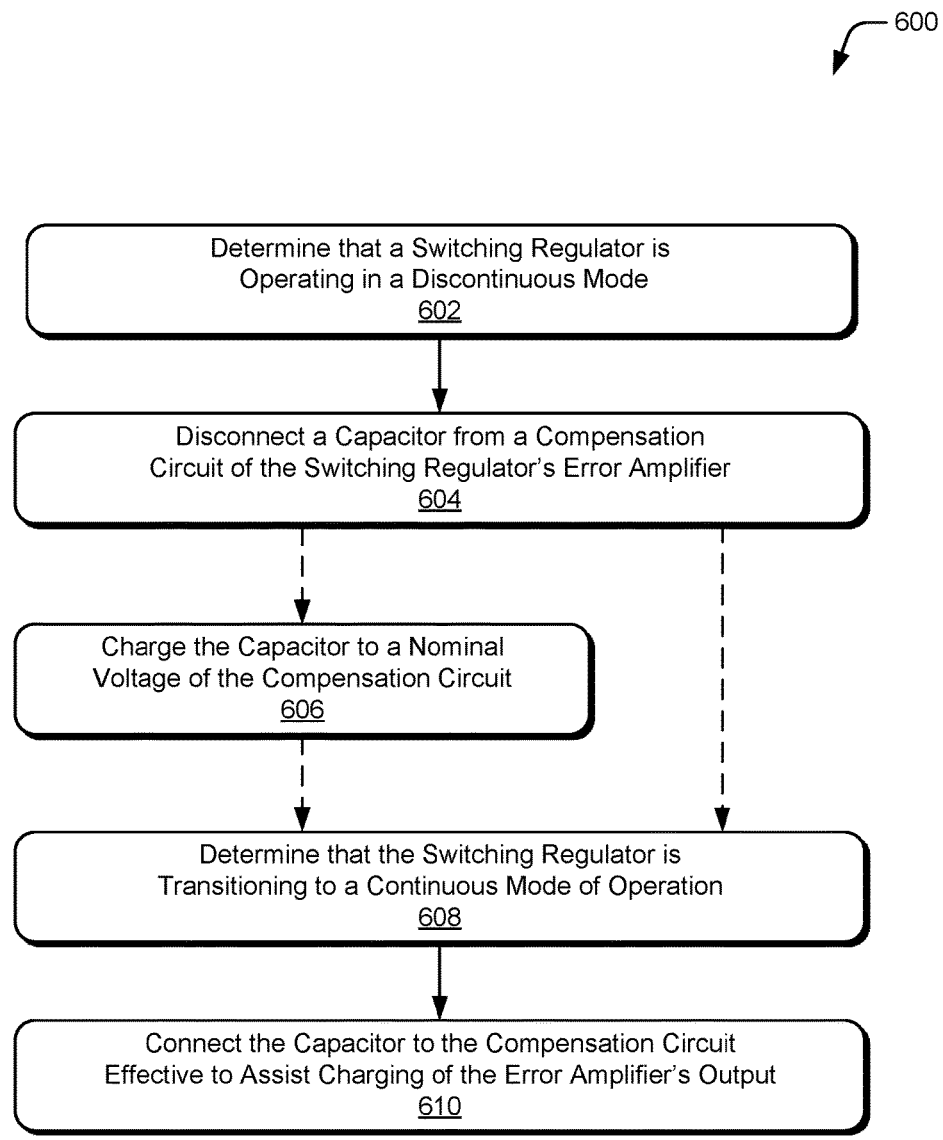
FIG. 6 illustrates an example method for isolating a compensation capacitor.

FIG. 6 depicts a method 600 for isolating a compensation capacitor, including operations performed by the switching controller 316 and/or the response circuitry 132.

At 602, it is determined that a switching regulator is operating in a discontinuous mode. In some cases, a transition into the discontinuous mode of operation is detected or caused, such as by a controller of the switching regulator. The discontinuous mode of operation may include a pulse frequency modulation mode that includes long periods of inactivity. In some cases, the inactivity permits voltage of switching regulator's compensation circuitry to discharge or fall. Alternately or additionally, an error amplifier may drive a voltage of the compensation circuitry low due to longer cycles of voltage feedback (e.g., voltage saw-toothing) during which the output voltage remains above a feedback threshold of the discontinuous mode.

At 604, a capacitor is disconnected from a compensation circuit of the switching regulator's error amplifier. The capacitor may be disconnected via any suitable means, such as a switch controlled by a controller of the switching regulator. In some cases, the capacitor is disconnected responsive to determining that the switching regulator is operating in a discontinuous mode or detecting the transition into the discontinuous mode.

Optionally at 606, the capacitor is charged to approximately a nominal voltage of the compensation circuit. The capacitor may be connected to a charging source via another switch controlled by the controller of the switching regulator. In some cases, the capacitor is charged by an op-amp, buffer amplifier, or voltage source configured to provide power at a nominal voltage of the error amplifier's output. Alternately or additionally, the charging source may be configured to provide power at an increased voltage level, such as 25 millivolts above the nominal voltage of the error amplifier's output.

At 608, it is determined that the switching regulator is transitioning from the discontinuous mode to a continuous mode of operation. In some cases, the switching regulator transitions to the continuous mode of operation to respond a load step to an amount of current that is higher than the current provided by the switching regulator in the discontinuous mode. For example, an amount of current consumed by a processor waking from a sleep state to a full-power state may step or increase from a few microamps to multiple amps of current.

At 610, the capacitor is connected to the compensation circuit of the error amplifier. This can be effective to assist with charging the compensation circuit or returning the error amplifier's output to a nominal voltage. Because voltage of the capacitor was not discharged while the switching regulator operated in the discontinuous mode, less energy is needed to bring the error amplifier's output to the nominal voltage. In cases in which the capacitor is charged at operation 606, the error amplifier's output voltage may recover even more-quickly. By facilitating rapid charging of the compensation circuitry connected to the error amplifier's output, the switching regulator is able to provide current more-quickly in the continuous mode of operation. This can be effective to enable the switching regulator to better respond to load steps that would otherwise draw down voltage at the switching regulator's output.

Figure 7:
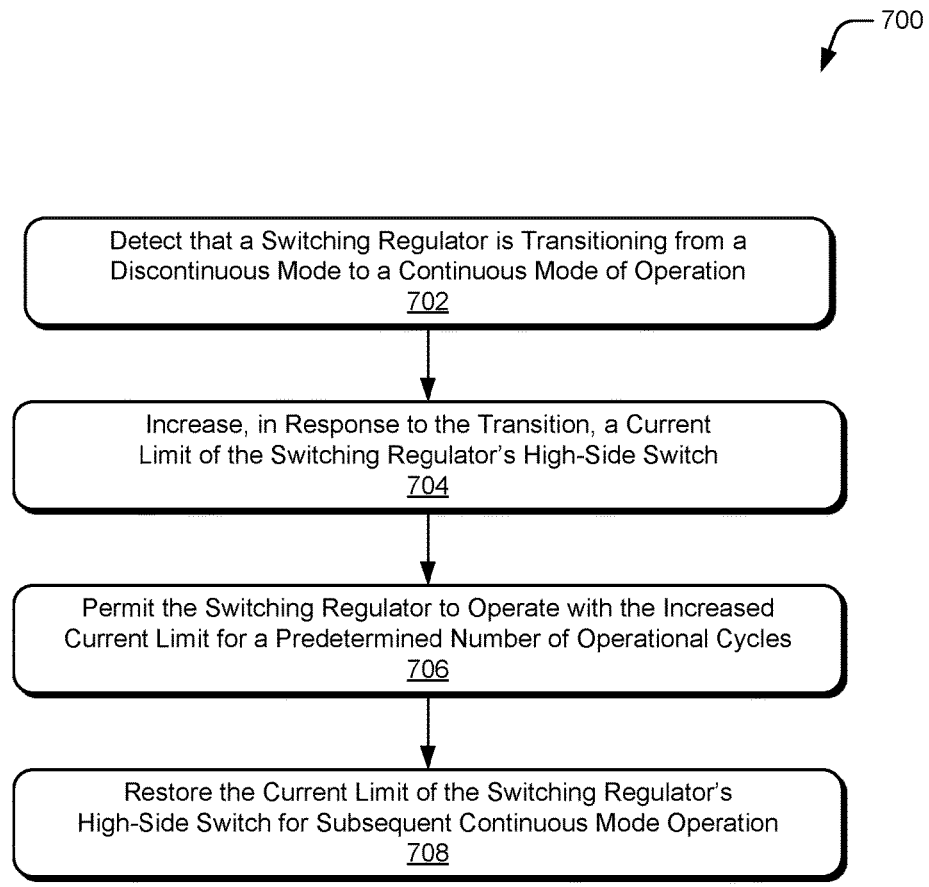
FIG. 7 illustrates an example method for increasing a current limit of a high-side switching element.

FIG. 7 depicts a method 700 for increasing a current limit of a high-side switching element, including operations performed by the switching controller 316 and/or the response circuitry 132.

At 702, it is determined that a switching regulator is transitioning from a discontinuous mode to a continuous mode of operation. The continuous mode of operation may be a PWM mode of the switching regulator that enables the switching regulator to provide an increased amount of current to a load. In some cases, the transition to the continuous mode of operation is responsive to sensing an increased amount of current drawn responsive to a load step. For example, a processor or wireless modem exiting a sleep state may produce a load step of a few microamps to multiple amps of current, which begins to draw down the output voltage of the switching regulator.

At 704, a current limit of the switching regulator's high-side switch is increased. This can be responsive to detecting that the switching regulator is transitioning to the continuous mode of operation. The current limit that is increased may be any suitable type of current limit, such as an amount of current or an amount of time that the current is permitted to exceed the current limit. For example, an amount of time that the current is allowed to exceed a predefined current limit (e.g., eight amps) may be increased approximately 25-30%. By so doing, the high-side switch can deliver an increased amount of current to the load at the switching regulator's output. Alternately or additionally, a current limit for the switching regulator's low-side switch can be increased to provide similar results.

At 706, the switching regulator is permitted to operate with the increased current limit. The switching regulator may operate with the increased current limit for any suitable amount of time or number of operating cycles. As described above, the switching regulator may be permitted to operate for approximately 25-30% higher than typically permitted before limiting current provided by the high-side switch. In some cases, the switching regulator operates with the increased current limit for the first few PWM cycles after the transition. In other cases, the switching regulator operates with the increased current limit for a particular amount of time, such as one to ten microseconds. Accordingly, the switching regulator is able to deliver or provide the increased amount of current for at least a short duration of time, which enables the switching regulator to more-quickly respond to load steps.

At 708, the current limit of the switching regulator's high-side switch is restored. In some cases, this is effective to prevent high levels of current from damaging components of the switching regulator, such as the switching transistors or external inductor. The current limit can be restored for subsequent operation in the continuous mode or until the switching regulator transitions to another operating mode. In some cases, this can be effective to preclude operation 702 because the current limit is modified prior to transitioning to the continuous mode.

Figure 8:
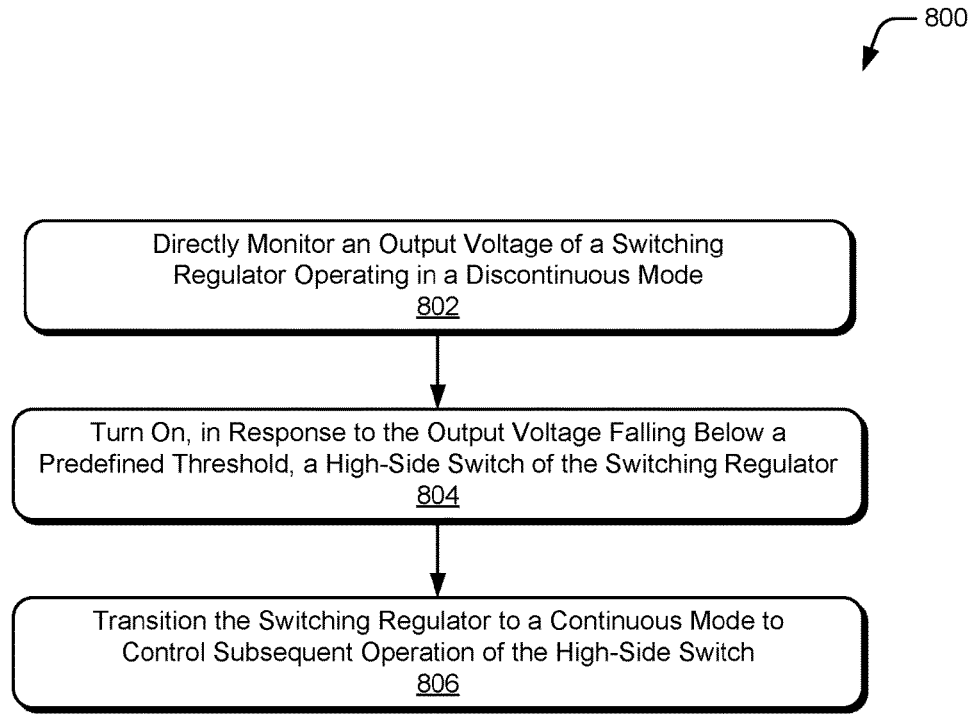
FIG. 8 illustrates an example method for monitoring an output voltage of a switching regulator for voltage drop.

FIG. 8 depicts a method 800 for monitoring an output voltage of a switching regulator for voltage drop, including operations performed by the switching controller 316 and/or the response circuitry 132.

At 802, an output voltage of a switching regulator is directly monitored while the switching regulator operates in a discontinuous mode. The discontinuous mode of operation may include a pulse frequency modulation mode or power save mode. In some cases, the output voltage is monitored by a comparator having an input connected to the switching regulator's output and an output connected to a controller of the switching regulator. The switching regulator may include another comparator or error amplifier that provide an indication of the output voltage during operation in a continuous mode.

At 804, a high-side switch of the switching regulator is turned on responsive to the output voltage falling below a predefined threshold. For example, an increased amount of current draw caused by a load step may cause the output voltage of the switching regulator to fall below the predefined threshold. The predefined threshold may be set at approximately a specified output voltage for the switching regulator, such as approximately two to five percent of the specified output voltage. In some cases, the predefined threshold is calibrated during startup of the switching regulator to ensure an accuracy of the predefined threshold. For example, after measuring the output voltage of the switching regulator in either mode of operation, the predefined threshold can be set for two percent below a nominal output voltage of the switching regulator.

At 806, the switching regulator is transitioned from the discontinuous mode to a continuous mode in response to the output voltage falling below the predefined threshold. During this transition, the top-side switch 308 may also be activated to charge the external inductor 304 to provide current to the external capacitor 314 and the load 306. The switching regulator then controls, via the continuous mode, subsequent operation of the high-side switch. This can be effective to enable the switching regulator to provide an increased amount of current to respond to a load step. In at least some cases, the direct monitoring of the output voltage and comparison with the predefined threshold enables the switching regulator to transition to the continuous mode more-quickly than a conventional feedback loop. By so doing, current is provided more-quickly in response to the load step thereby reducing a voltage drop at the output of the switching regulator.

System-on-Chip

Figure 9:
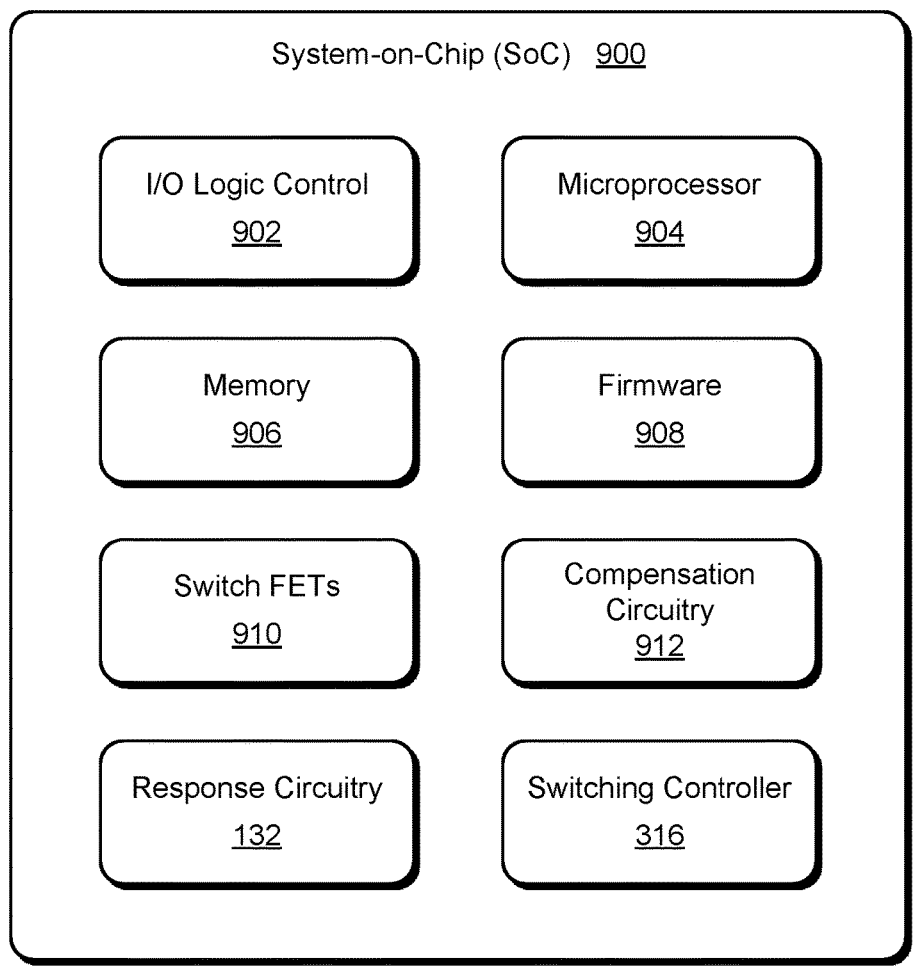
FIG. 9 illustrates a System-on-Chip (SoC) environment for implementing aspects of fast transient response for switching regulators.

FIG. 9 illustrates a System-on-Chip (SoC) 900, which can implement various aspects of fast transient response for switching regulators. A SoC can be implemented in any suitable device, such as a smart-phone, a cellular phone, a laptop computer, a tablet computer, a server, a wireless router, network-attached storage, a camera, or any other type of device that may implement arrayed memory.

The SoC 900 can be integrated with electronic circuitry, a microprocessor, memory, input-output (I/O) logic control, analog-to-digital circuits, communication interfaces and components, other hardware, firmware, and/or software useful to provide power management for a device, such as any of the above-listed devices. SoC 900 can also include an integrated data bus (not shown) that couples the various components of the SoC for data communication between the components. In some cases, these various components may be configured to implement concepts described herein via internal components (e.g., transistors), external components (e.g., inductors or capacitors), or any suitable combination thereof In this example, the SoC 900 includes various components such as input-output (I/O) logic control 902 (e.g., analog-to-digital or digital-to-analog logic) and a microprocessor 904 (e.g., any of a microcontroller, application processor, DSP, or PWM controller). The SoC 900 also includes a memory 906, which can be any type of RAM, nonvolatile memory (e.g., NAND Flash), read-only memory (ROM), electronically erasable programmable ROM (EEPROM), and/or other suitable electronic data storage. The SoC 900 can also include various state machines, software, or operating systems, such as firmware 908, which can be processor-executable instructions maintained by memory 906 and executed by microprocessor 904. The SoC 900 can also include other various communication interfaces and components, other hardware, firmware, and/or software.

The SoC 900 also includes switch FETs 910, compensation circuitry 912 (e.g., resistors and capacitors), a switching controller 316, and response circuitry 132, which may be embodied as disparate or combined components, as described in relation to aspects presented herein. Examples of these various components, functions, and/or entities, and their corresponding functionality, are described with reference to the respective components of the environment 100 shown in FIGS. 1, 3, and 4. The switching controller 316, either in whole or part, can be implemented as processor-executable instructions maintained by the memory 906 and executed by the microprocessor 904 to implement various aspects and/or features described herein. In some cases, the SoC 900 is implanted as a switch-mode power supply (SMPS) controller or power management integrated circuit (PMIC).

The switching controller 316 and response circuitry 132, either independently or in combination with other entities, can be implemented with any suitable combination of components to implement various aspects and/or features described herein. Response circuitry 132 may also be provided integral with other entities of SoC 900, such as integrated with the I/O logic 902, compensation circuitry 912, or any other signal processing or conditioning section within SoC 900. Alternately or additionally, the response circuitry 132 and the other components can be implemented as hardware, firmware, fixed logic circuitry, or any combination thereof that is implemented in connection with power management circuitry of the computing device 102.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A power supply circuit comprising:
   a transistor coupled to a power source and configured to provide current to a load connected to an output of the power supply circuit;
   an amplifier having an input operably connected to the output of the power supply circuit and an output configured to provide an indication of voltage at the output of the power supply circuit;
   a transconductance load having a transconductance less than a transconductance of the amplifier;
   a switch connected between the output of the amplifier and the transconductance load; and
   a controller operably connected to the output of the amplifier and to a gate of the transistor, the controller configured to:
      control, via a discontinuous mode of operation and based on the indication of the voltage, an amount of the current provided by the transistor to the load;
      connect, via the switch and while operating in the discontinuous mode, the transconductance load to the output of the amplifier effective to dampen the indication of the voltage;
      detect, based on the damped indication of the voltage, that a current draw of the load that exceeds the amount of current provided in the discontinuous mode; and
      transition, responsive to detecting that the current draw exceeds the amount of current provided, from the discontinuous mode of operation to a continuous mode of operation effective to enable the controller to increase the amount of current provided by the transistor to the load.

2. The power supply circuit as recited in claim 1, wherein the controller is further configured to disconnect, while operating in the continuous mode, the transconductance load from the output of the amplifier effective to cease the dampening of the indication of the voltage.

3. The power supply circuit as recited in claim 1, wherein dampening the indication of the voltage is effective to limit an amount by which the indication of the voltage falls while the controller operates in the discontinuous mode.

4. The power supply circuit as recited in claim 1, wherein the continuous mode of operation is a pulse-width modulation mode or the discontinuous mode of operation is a pulse frequency modulation mode.

5. The power supply circuit as recited in claim 1, wherein the transconductance load comprises an operational amplifier implemented as a buffer amplifier or unity gain amplifier.

6. The power supply circuit as recited in claim 1, wherein the transconductance of the transconductance load is approximately one half to one quarter of the transconductance of the amplifier.

7. The power supply circuit as recited in claim 1, wherein the transconductance of the transconductance load is less than approximately one quarter of the transconductance of the amplifier.

8. The power supply circuit as recited in claim 1, wherein the input of the amplifier is operably connected to the output of the power supply circuit via a voltage divider.

9. The power supply circuit as recited in claim 1, wherein the controller is operably connected to the output of the amplifier via a comparator that is configured to compare the indication of the output voltage with an indication of the amount of current provided by at least the transistor.

10. A method comprising:
   determining that a switching regulator is operating in a discontinuous mode to provide current to a load connected to an output of the switching regulator, the discontinuous mode controlling a voltage at the output of the switching regulator based on an indication of the voltage provided by an error amplifier;
   connecting, responsive to the determination, a transconductance load to an output of the error amplifier to dampen the indication of the voltage provided by the error amplifier;
   detecting, based on the dampened indication of the voltage, that a current draw of the load exceeds an amount of the current provided by the switching regulator operating in the discontinuous mode; and
   causing, responsive to detecting that the current draw exceeds the current provided in the discontinuous mode, the switching regulator to transition from the discontinuous mode of operation to a continuous mode of operation effective to increase the amount of current provided to the load.

11. The method as recited in claim 10, further comprising disconnecting the transconductance load from the error amplifier to cease the dampening of the indication of the voltage provided by the error amplifier.

12. The method as recited in claim 10, wherein dampening the indication of the voltage is effective to prevent the indication of the voltage from drooping or saturating down while the switching regulator operates in the discontinuous mode of operation.

13. The method as recited in claim 10, wherein the error amplifier is configured as an integrator and connecting the transconductance load is effective to configure the error amplifier as a damped integrator having a gain that is higher than one.

14. The method as recited in claim 10, wherein the continuous mode of operation is a pulse-width modulation mode and the discontinuous mode of operation is a pulse frequency modulation mode.

15. A System-on-Chip (SoC) comprising:
   a first transistor coupled to a power rail of the SoC and an output of the SoC at which current is provided by the first transistor to power a load;
   a second transistor coupled to ground rail of the SoC and the output of the SoC at which the current is provided by the second transistor to power the load;
   an error amplifier having an input operably connected an input of the SoC at which a voltage is received from the load and an output configured to provide an indication of the voltage;
   a transconductance load having a transconductance less than a transconductance of the error amplifier;
   a switch connected between the output of the error amplifier and the transconductance load; and
   a controller operably connected to the output of the error amplifier and respective gates of the first and second transistors, the controller configured to:
      control, via a discontinuous mode of operation and based on the indication of the voltage, an amount of the current provided by the first and second transistors to the load;
      connect, via the switch and while operating in the discontinuous mode, the transconductance load to the output of the error amplifier effective to dampen the indication of the voltage;
      detect, based on the damped indication of the voltage, that a current draw of the load that exceeds the amount of current provided in the discontinuous mode; and
      transition, responsive to detecting that the current draw exceeds the amount of current provided, from the discontinuous mode of operation to a continuous mode of operation effective to increase the amount of current provided by the first and second transistors to the load.

16. The System-on-Chip of claim 15, wherein the controller is further configured to disconnect, while operating in the continuous mode, the transconductance load from the output of the error amplifier effective to cease the dampening of the indication of the voltage.

17. The System-on-Chip of claim 15, wherein the error amplifier is implemented with an operational amplifier, analog-to-digital logic, or a digital signal processor.

18. The System-on-Chip of claim 15, further comprising a resistor network interposed between the input of the SoC and the error amplifier.

19. The System-on-Chip of claim 15, wherein the continuous mode of operation is a pulse-width modulation mode and the discontinuous mode of operation is a pulse frequency modulation mode.

20. The System-on-Chip of claim 15, wherein the SoC is implemented as a switch-mode power supply controller or power management integrated circuit.

* * * * *